Patented May 10, 1938

2,117,120

UNITED STATES PATENT OFFICE 2,117,120

MANUFACTURE OF MERCAPTOTHIAZOLES

Claude H. Smith, Tallmadge, and Carl W. Gay, Akron, Ohio, assignors to Wingfoot Corporation, Akron, Ohio, a corporation of Delaware No Drawing. Application October 16, 1935, Serial No. 45,272

14 Claims. (Cl. 260—44)

This invention relates to a method of producing accelerators for the vulcanization of rubber. More particularly, it relates to a method of producing mercaptothiazoles.

One object of the invention is to improve the quality of the mercaptothiazole by increasing its purity. Another object is to obtain this increase in purity by a simpler and less expensive process than those in previous use.

In the production of mercaptothiazoles by the high temperature reaction of an amine, sulphur, and carbon disulphide as in the process described in U. S. Patent No. 1,631,871, certain diluent impurities are formed which reduce the purity of the product. The aforementioned patent speaks of these impurities and advocates solution of the reaction product in sodium hydroxide followed by reprecipitation by the addition of an acid, such as hydrochloric. This step gives a material of satisfactory commercial purity.

By the present invention, this degree of purity is obtained in a simpler manner and with the saving of the sodium hydroxide and a considerable portion of the acid required for the solution and reprecipitation method. In addition, a product of very desirable physical characteristics is obtained. By the usual method of purification consisting of preparation of the sodium or other soluble salt followed by reprecipitation of the mercaptan with acid, a rather fluffy product is obtained which often causes handling difficulties, particularly in connection with sifting. By the process of the invention, a denser, harder product is formed. This material sifts much more readily than that prepared by the caustic-acid method of purification and otherwise handles better than that material.

The manufacture of mercaptobenzothiazole may be used to illustrate the invention. Aniline, sulphur, and carbon disulphide are reacted at elevated temperature and pressure, as described in the said U. S. Patent No. 1,631,871. In the process as regularly practiced, the molten product is stirred into water in order to cool it and obtain the material in convenient small crystalline form. This material may then be purified by dissolving in sodium hydroxide and reprecipitating with an equivalent amount of acid.

This latter purification step may be eliminated if, instead of quenching in water, the molten reaction product is stirred into a dilute acid solution, e. g., one percent sulphuric acid in water. The product is then freed from acid, by washing with water.

In two comparative batches prepared by otherwise identical procedures, the first, discharged into water at 60° C., produced a product which was 87 percent mercaptobenzothiazole. The second, discharged into a one percent sulphuric acid solution at 60° C., yielded a material of 92 percent purity.

Although a one percent solution of sulphuric acid has been used in the example, this is not to be construed as a limitation of the invention. Higher or lower acid concentrations may be similarly employed. Also other inorganic acids such as hydrochloric, phosphoric, nitric, etc., may be substituted for sulphuric; or, if desired, water soluble organic acids such as acetic and chloracetic acids may be used. Moreover, it is not intended that the invention shall be limited to the temperature of the example. The temperature may be either higher or lower, the higher ones generally giving the greater purification. From a practical standpoint temperatures of 50–90° C. will usually be most satisfactory.

Also, the method may be employed for any other mercaptothiazole prepared by this or a similar method. Illustrative are the 1-mercapto tolyl thiazoles, the 1-mercapto xylyl thiazoles, the 1-mercapto naphthathiazoles, the 1-mercapto alkoxy benzothiazoles, 1-mercapto 3-phenyl benzothiazole, etc.

The improvement which constitutes the invention may be utilized in several ways. That already outlined is for producing a product of a certain technical purity. If this purity is not all that is desired, the process may be considered as merely an intermediate purification and may be followed by solution in sodium hydroxide with reprecipitation by acid, or the material may be recrystallized or treated by any other refining method.

Therefore, although we have described the preferred form of the invention in detail, it will be apparent to those skilled in the art that the invention is not limited thereto but that various modifications may be made therein without departing from the spirit of the invention or the scope of the appended claims wherein it is intended to cover by suitable expression all features of patentable novelty inherent in the invention.

What we claim is:

1. In the manufacture of a mercapto arylene thiazole of the benzene and naphthalene series, the step which comprises discharging the molten mercapto arylene thiazole into a dilute water solution of an acid.

2. In the manufacture of 1-mercaptobenzothiazole, the step which comprises discharging the molten 1-mercaptobenzothiazole into a dilute water solution of an acid.

3. In the manufacture of 1-mercaptobenzothiazole, the step which comprises discharging the molten 1-mercaptobenzothiazole into a dilute water solution of an acid which is at a temperature of 50 to 90° C.

4. In the manufacture of a mercapto arylene thiazole of the benzene and naphthalene series, the step which comprises discharging the molten mercapto arylene thiazole into a dilute aqueous solution of sulphuric acid.

5. In the manufacture of 1-mercaptobenzothiazole, the step which comprises discharging the molten 1-mercaptobenzothiazole into a dilute aqueous solution of sulphuric acid.

6. The improved process of preparing mercaptobenzothiazole which comprises reacting aniline, sulphur and carbon bisulphide under conditions at which molten mercaptobenzothiazole is formed, and discharging the resulting molten product into a dilute water solution of an acid.

7. The improved process of preparing mercaptobenzothiazole which comprises reacting mercaptobenzothiazole-forming materials under reacting conditions and discharging the resulting molten crude mercaptan into a dilute water solution of an acid.

8. In the manufacture of mercaptobenzothiazole comprising reacting mercaptobenzothiazole-forming materials and obtaining a crude molten product containing free mercaptobenzothiazole, the step which comprises charging said crude molten product into a dilute water solution of an acid.

9. In the manufacture of mercaptobenzothiazole comprising reacting aniline, sulphur and carbon bisulphide and obtaining a molten mass containing mercaptobenzothiazole, the step which comprises charging said molten mass into a dilute aqueous solution of sulphuric acid which is at a temperature of from 50 to 90° C.

10. In the manufacture of a mercapto arylene thiazole of the benzene and naphthalene series comprising reacting mercapto arylene thiazole-forming materials under conditions forming a molten mass containing the free mercapto arylene thiazole, the step which comprises charging said molten mass into a dilute aqueous solution of an acid heated to a temperature of from 50 to 90° C.

11. In the manufacture of a mercaptoarylenethiazole of the benzene and naphthalene series comprising reacting a primary aromatic amine, sulphur and carbon bisulphide and obtaining a molten reaction mass containing the mercaptoarylenethiazole, the step which comprises charging said molten reaction mass into a dilute water solution of an acid.

12. In the manufacture of a mercaptoarylenethiazole of the benzene and naphthalene series comprising reacting a primary monocylic aromatic amine, sulphur and carbon bisulphide and obtaining a molten reaction mass containing the mercaptoarylenethiazole, the step which comprises charging said molten reaction mass into a dilute water solution of an acid.

13. In the manufacture of a mercaptoarylenethiazole of the benzene and naphthalene series comprising reacting a primary aromatic amine, sulphur and carbon bisulphide and obtaining a molten reaction mass containing the mercaptoarylenethiazole, the step which comprises charging said molten reaction mass into a dilute aqueous solution of sulphuric acid.

14. In the manufacture of a mercaptoarylenethiazole of the benzene and naphthalene series by a method of synthesis employing temperatures sufficiently high to produce a molten reaction mass in which the impurities are of substantially the same character as those present in the crude mercaptoarylenethiazole prepared by the interaction of a primary aromatic amine, sulphur, and carbon bisulphide, the step which comprises charging said molten reaction mass into a dilute water solution of an acid.

CLAUDE H. SMITH.
CARL W. GAY.